United States Patent [19]
Charrier

[11] Patent Number: 5,152,179
[45] Date of Patent: Oct. 6, 1992

[54] DEVICE FOR MEASURING VARIATIONS IN AMBIENT PRESSURE

[76] Inventor: George O. Charrier, 859 N. Bend Rd. #514, Cincinnati, Ohio 45224

[21] Appl. No.: 740,952

[22] Filed: Aug. 6, 1991

Related U.S. Application Data

[63] Continuation-in-part of Ser. No. 631,634, Dec. 21, 1990, abandoned.

[51] Int. Cl.$^5$ .............................................. G01L 7/22
[52] U.S. Cl. ...................................... 73/384; 73/713; 374/143
[58] Field of Search ............. 73/713, 384, 385, 170 R, 73/700, 708, 714; 374/143

[56] References Cited

U.S. PATENT DOCUMENTS

| | | | |
|---|---|---|---|
| 2,179,838 | 11/1939 | Young | 73/713 |
| 2,345,243 | 3/1944 | Eakin | 446/267 |
| 2,352,302 | 6/1944 | Young | 73/713 |
| 2,439,342 | 4/1948 | Hudson | 73/713 |
| 2,690,675 | 10/1954 | Farrier | 73/384 |
| 2,701,966 | 2/1955 | Brown | 73/713 |
| 3,261,207 | 7/1966 | Gilmont | 73/713 |
| 4,448,409 | 5/1984 | Kaga et al. | 227/8 N |

OTHER PUBLICATIONS

Book 700 Science Experiments for Everyone Complied by Unesco.

Primary Examiner—Donald O. Woodiel
Attorney, Agent, or Firm—Frost & Jacobs

[57] ABSTRACT

There is provided an apparatus for measuring variations in pressure including a container for housing a volume of liquid and an indicator float to be movably supported by the liquid therein. The float is to have a hollow interior portion for maintaining a volume of compressible fluid, and is vertically movable within the container. The apparatus further includes a variable buoyancy equilibrium force device for automatically offsetting buoyant forces created by the compressible fluid within the float, whereby the equilibrium force is automatically varied in response to changing buoyancy of the float corresponding to changing ambient pressures. In a preferred embodiment, the variable buoyancy equilibrium force device comprises a flexible ballast structure attached to an adjustable support above the float, and wherein excess length of the ballast collects in a ballast retainer on the upper portion of the float.

11 Claims, 6 Drawing Sheets

DEVICE FOR MEASURING VARIATIONS IN AMBIENT PRESSURE

REFERENCE TO RELATED APPLICATION

This is a continuation-in-part of application Ser. No. 07/631,634, filed Dec. 21, 1990 in the name of the present inventor, now abandoned.

TECHNICAL FIELD

This invention relates to an apparatus for measuring variations in pressure, and, more particularly, to a relatively simple device which can provide sensitive and accurate monitoring of ambient pressure, and which features an indicator float which moves vertically in response to variations in pressure, and means connected to that float to automatically provide a variable buoyancy equilibrium force to provide a predetermined degree of sensitivity to the device.

BACKGROUND ART

Through the years, a great number of devices have been assembled to measure air pressure with varying degrees of success and accuracy. For example, simple mercury barometers can be assembled by providing a glass tube having one end sealed and being held vertically with the open end submerged in a bottle or dish such that the difference in height of mercury in the jar and the tube measures the air pressure. Simple barometric devices can also be provided by inverting a bottle which has been partly filled with water such that the neck of the bottle is under the surface of more water placed in a dish or saucer.

Such an arrangement is also used in various forms of poultry and cattle feeder devices. This arrangement is less accurate than the mercury arrangement as a result of, among other reasons, inherent evaporation of the water into the ambient atmosphere. Additionally, commercially available barometer devices commonly feature relatively low sensitivity to pressure changes, and, consequently, do not register small changes and do not demonstrate larger changes in a dramatic or interesting manner.

Another pressure measuring apparatus is shown and described in U.S. Pat. No. 2,439,342, which issued to W. J. Hudson on Apr. 6, 1948. The Hudson patent discloses the use of a movable hollow member which, immersed in liquid, assumes an equilibrium position of buoyant suspension corresponding to the ambient pressure surrounding the apparatus. Particularly, the Hudson apparatus includes an external container housing a body of liquid having a very low vapor pressure. Within the liquid is an inverted hollow member having an open bottom, and a space occupying equilibrium restoring body which is rigidly fixed at its lower end to a guiding frame within the container. The hollow member is supported for vertical movement within the guiding frame which engages the internal walls of the container to provide a positive support for the space occupying body over which the hollow member is inverted.

When there is a pressure increase imposed on the liquid within the Hudson container, the volume of air trapped within the hollow member is compressed and the hollow member moves downwardly. A new position of equilibrium is achieved when the increase in exposure of the equilibrium restoring body equals the decrease in the volume of the trapped gas. Hudson teaches that the sensitivity of this device can be selected by choosing the ratio of the cross-sectional area of the hollow member to that of the equilibrium restoring body, suggesting that when the ratio is large, the sensitivity is high.

The Hudson device further includes a correction for variations in the performance of the device due to temperature differences. Particularly, a series of reference marks is to be placed on the stationary equilibrium restoring body, and the particular reference mark used in monitoring pressure differences is chosen depending upon the prevailing temperature. In a second embodiment, Hudson contemplates the use of an integral thermometer placed within the equilibrium restoring body such that the upper surface of the liquid in the thermometer forms the reference mark against which pressure differences are to be monitored. Another embodiment includes a dynamic equilibrium restoring body which is carried upon a bi-metallic mounting arm designed to react proportionally to temperature. Allegedly this bi-metallic mounting arrangement automatically adjusts the position of the equilibrium restoring body in accordance with the prevailing temperature. As can be seen, however, the Hudson pressure measuring apparatus is relatively complex, requiring the interaction of a plurality of parts which must be carefully mounted within the external container, requiring precise sizing and complicating assembly of these parts, and making uniformity and accuracy difficult to achieve.

Another device for indicating changes in atmospheric pressure is shown in U.S. Pat. No. 2,690,675, which issued to T. R. Farrier on Oct. 5, 1954. The Farrier fishing indicator utilizes three floats which each have different specific gravities. The device is intended to indicate the relative chances of successful fishing based upon existing atmospheric pressure, and includes an adjustment mechanism to ensure that the pressure of the fluid within the container is compensated for the normal atmospheric pressure of 29.92 inches of mercury. This device is to include a transparent container filled with a low viscosity liquid, a plurality of floats of various and distinct specific gravities, and a diaphragm closing the container to the atmosphere.

The base of the Farrier container includes a threaded cam for adjusting the pressure on the diaphragm to adjust the device and to compensate for the particular altitude at which the device is being used. Each of the floats includes an interior hollow portion enclosing a predetermined amount of air and being open to the low viscosity liquid at its bottom surface. Upon increased atmospheric pressure, the diaphragm of the container is urged upwardly and the pressure within the container increases, thereby compressing the air within the individual floats and increasing their effective specific gravities causing them to sink. If atmospheric pressure is low, Farrier teaches that the fishing will be excellent; whereas if atmospheric pressure is high, fishing will be poor.

The Farrier device relies on the well-known "Cartesian diver" principle that the density of an object housing a predetermined volume of compressible fluids will increase in density in response to a rise in pressure, and will decrease in density as the pressure falls. Other examples of the use of Cartesian diver principles can be found in U.S. Pat. Nos. 2,345,243 (which issued to W. D. Eakin on Mar. 28, 1944) and 4,448,409 (which issued to T. Kaga et al. on May 15, 1984). These references both pertain to aquatic diving toys which respond to pressure changes to provide movement of the toy figure for entertainment purposes.

The Eakin aquatic doll includes a hollow portion having a movable diaphragm member with a weight attached, wherein changes in pressure tend to move the weight and change the volume of the hollow portion within the figure, resulting in predetermined movement of the figure within a volume of support liquid. The aquatic toy can undergo a sequence of predetermined movements initiated by relatively rapid and substantial pressure changes induced by a control device. The movements and actions can be predetermined and varied by adjusting the timing, duration, and amount of pressure changes induced on the support liquid by the control device.

Similarly, Kaga et al. teach a cartesian diving toy which includes a convoluted bellows structure susceptible to elongation and shortening in response to pressure changes to provide an essentially linear reaction to those pressure changes. Kaga et al. further contemplate that pressure variations and temperature variations will both be transformed into linear movement via the convoluted bellows, and tail portions of the toy fish are linked to the bellows so that such linear movement acts to move the tail to propel the toy within its support liquid.

A pressure gauge described as taking advantage of the Cartesian diver principle is set forth in U.S. Pat. No. 2,701,966, which issued to C. Brown. The Brown pressure gauge is contemplated for substitution for a conventional tire cap to provide visual indication when the pressure in the tire has dropped below a desired inflation pressure. Brown further suggests compensation for temperature variations by careful selection of materials, and by taking into account the applicable coefficients of volumetric expansion of the various elements involved. The pressure gauge can be provided with a variable float, or with a number of floats of varying specific gravity, however, Brown states that the variable float cannot be readily fully temperature compensated. The variable float of Brown is taught as including a flexible element or thread depending below the float to effectively vary the specific gravity in accordance with the height of the float.

Heretofore, there has not been available in the industry a relatively simple apparatus for measuring variations in pressure which is easy to assemble and can provide extremely sensitive monitoring of ambient pressure variations. More accurate devices have generally required relatively complex arrangements of parts having concomitant difficulties in assembling the various parts and/or whose complex nature detracts from the appearance and usefulness of the device.

DISCLOSURE OF THE INVENTION

It is an object of this invention to provide an apparatus for measuring variations in pressure which is relatively simple in design, relatively inexpensive, accurate and pleasing in appearance.

It is another object of the present invention to provide an improved apparatus for measuring variations in ambient pressure and featuring an indicator float having a hollow interior portion for maintaining a compressible fluid, and means connected to the float for automatically providing a variable buoyancy equilibrium force to offset buoyant forces created by the compressible fluid within the float.

It is yet another object of the present invention to provide a simple and accurate apparatus for measuring variations in pressure which can automatically compensate for ambient temperature differences in a simple and reliable manner.

It is also an object of this invention to provide an apparatus for measuring variations in pressure which can be easily constructed for accurate use in a variety of different geographic areas having slightly differing altitudes.

It is another object of this invention to provide an improved apparatus for measuring variations in ambient pressure which can be designed to feature a predetermined sensitivity to differences in ambient pressure and/or which can be designed to provide a plurality of predetermined sensitivities to pressure differences depending upon the absolute atmospheric pressures being monitored.

In accordance with one aspect of the present invention, there is provided an apparatus for measuring variations in pressure, and, in a preferred embodiment, including a container for housing a volume of liquid and an indicator float to be movably supported by the liquid therein. The float is to have a hollow interior portion for maintaining a volume of compressible fluid, and is vertically movable within the container. The apparatus further includes a variable buoyancy equilibrium force device for automatically offsetting buoyant forces created by the compressible fluid within the float, whereby the equilibrium force is automatically varied in response to changing buoyancy of the float corresponding to changing ambient pressures. In a preferred embodiment, the variable buoyancy equilibrium force device comprises a flexible floatation structure attached in conjunction with the float to provide an automatically varying buoyant force as the position of the float changes.

The apparatus of the present invention may also include a compensator for adjusting the apparatus in response to relative temperature changes so that pressure changes can be accurately monitored regardless of temperature. In a preferred embodiment, the compensator comprises a predetermined design of the indicator float, wherein the float is to have a first predetermined displacement volume and a second predetermined volume of compressible fluid maintained therewithin wherein the ratio of the second predetermined volume to the first predetermined volume corresponds to the ratio of the coefficient of cubical expansion of the liquid within the container to the coefficient of cubical expansion of the compressible fluid.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
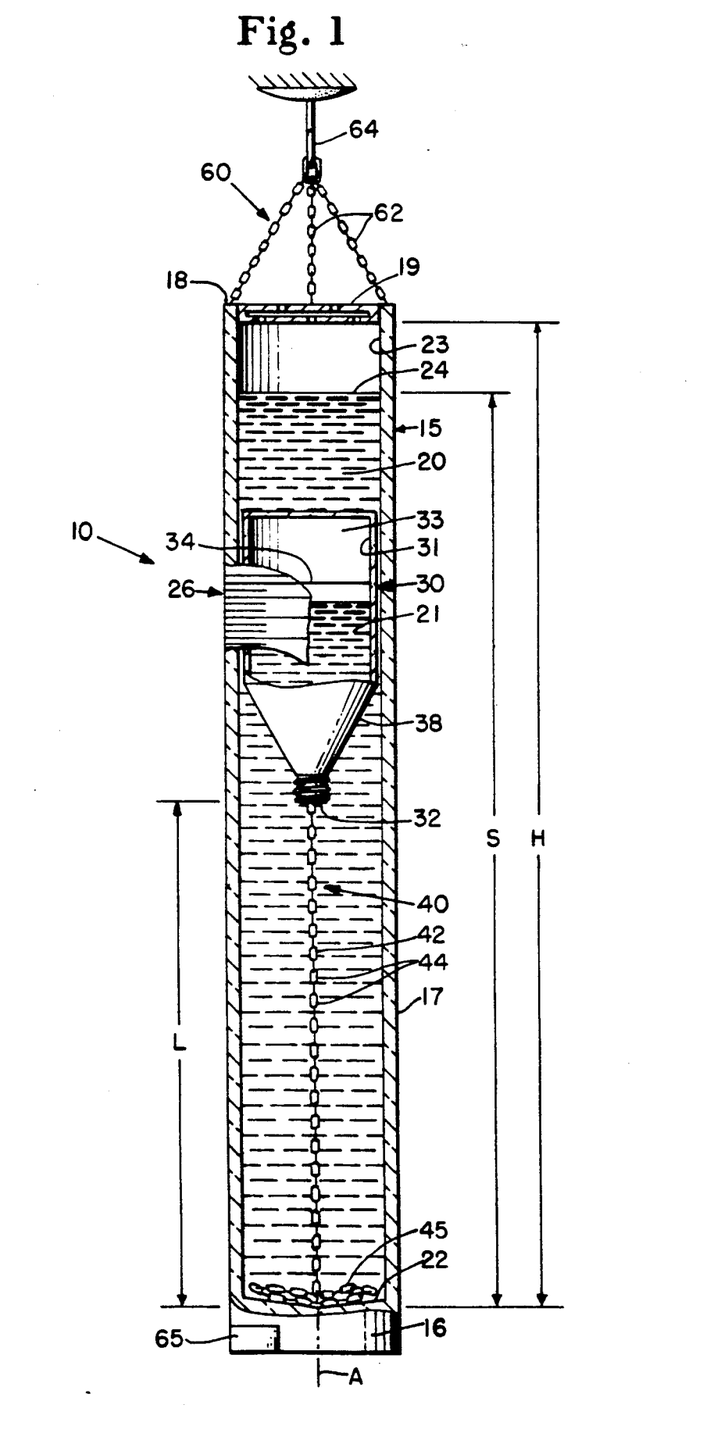
FIG. 1 is a broken-out, partial vertical cross-sectional view of a super-sensitive barometer made in accordance with the present invention.

Referring now to the drawings in detail, wherein like numerals indicate the same elements throughout the views, and wherein numerals having the same final two digits (e.g. 10, 110 and 210) indicate corresponding elements in various views, FIG. 1 illustrates a super-sensitive apparatus 10 for measuring variations in ambient pressure and made in accordance with the present invention. Apparatus 10 comprises a hollow container 15 extending upwardly from a base 16 and comprising an outer wall 17 which can preferably be of a continuous cylindrical conformation. At least a portion of container 15 is preferably transparent to facilitate viewing of the contents of the container from the exterior thereof. It is contemplated that translucent material might also be employed for less direct viewing of the interior of apparatus 10.

Container 15 has a hollow interior portion 23 extending from bottom wall 22 to upper portion 18, and may include a cap 19 which permits the transmission of pressure changes from the ambient to the interior of container 15 (such as by one or more small perforations). Container 15 is to be substantially filled with a support liquid 20, such as low viscosity mineral oil having a predetermined coefficient of cubical expansion (CCE). While a variety of liquids can be utilized as the support liquid in apparatus 10, mineral oil is preferred due to its very low vapor pressure and its low miscibility with air. While various mineral oils may exhibit varying coefficients of cubical expansion, the preferred mineral oil has a CCE of approximately 0.000977 at 25° C. As will be seen, it is advantageous to utilize a support liquid 20 having a relatively high coefficient of cubical expansion in order to provide sufficient expansion and contraction of that liquid in response to fluctuating temperatures to effectively offset corresponding changes in the buoyancy of float 30 so as to effect automatic temperature compensation for apparatus 10.

The upper surface 24 of support liquid 20 can be maintained a convenient distance below the upper rim 18 of container 15 to obviate accidental spillage or over filling. Cap 19 is also preferred to further minimize the chance of spillage of support liquid 20 from container 15, and to keep support liquid 20 clean. It is contemplated that cap 19 may comprise a filtering element or baffle arrangement (such as the offset perforations shown in FIG. 1) to prevent dust and other foreign matter from entering container 15.

Once container 15 is properly filled with support liquid 20 and prior to placement of closure cap 19, indicator float 30 and its attached variable buoyancy equilibrium device 40 are inserted into container 15. As illustrated in FIG. 1, indicator float 30 is to include a hollow interior portion 31 and an opening 32 located adjacent its lower portion. Float 30 can, in its simplest form, comprise an inverted bottle with its open top facing downwardly as shown, or can comprise a specially designed apparatus as will be described with reference to other drawing figures described below. Indicator float 30 is preferably designed such that its exterior or overall volume, as circumscribed by its outer periphery 38, will displace a predetermined volume within support liquid 20, and having a second predetermined volume of compressible fluid 33 trapped therewithin. Compressible fluid 33 can, in its simplest form, comprise dry air, or may comprise other compressible fluids such as Nitrogen, Neon, Argon, Helium or similar gas which is inert with respect to the particular support liquid 20 held within container 15. Float 30 may also include ballast structure (e.g., steel shot or similar materials of known density and weight—not shown) to facilitate the provision of a particular effective specific gravity thereto, as desired.

Indicator float 30 also preferably includes a monitor line 34 or similar marking which can be observed from the exterior of apparatus 10 to facilitate monitoring the changing positions of float 30 therewithin. As indicated in the broken-out portion of FIG. 1, indicia 26 of container 15 can also facilitate monitoring the relative position of monitor line 34 of float 30. Monitor line 34 can preferably comprise an etching or similar identification line on indicator float 30. If air is utilized as the compressible fluid within float 30, it is preferred that all moisture be removed from that air to ensure that the entire volume of compressible fluid 33 is indeed compressible. Moisture or other impurities in the entrapped air within float 30 could conceivably interfere with the operation and/or accuracy of apparatus 10.

While the exact material from which float 30 is made can be varied, in order to ensure the highest accuracy and dependable operation of apparatus 10 in all conditions, it is preferred that the material have a very low coefficient of cubical expansion. Pure silica glass is preferred due to its essentially negligible CCE (e.g. 0.00000129/°C.). It is also preferred that the outside dimensions of float 30 be such that a minimum of approximately 0.125 inches (about 0.32 centimeters) is maintained between the outer periphery of float 30 and the inner surfaces of container walls 17. While this distance is not critical, it is important to maintain a sufficient clearance to ensure that indicator float 30 can move freely within the hollow portion 23 of container 15 without substantial frictional or capillary resistance.

As an example, walls 17 of container 15 might preferably have a substantially cylindrical conformation, having an inner hollow diameter of approximately 1.5 inches (3.8 cm) while the outer diameter of a substantially cylindrical float 30 would be approximately 1 3/16 inches (3.02 cm). In such embodiment, container 15 might preferably have an overall inner height H of approximately 48 inches (122 cm), wherein support liquid 20 would be filled such that upper surface 24 would be approximately 46 inches (117 cm) inches above bottom wall 22. Indicator float 30 would be vertically movable within container 15 along central axis A in response to varying atmospheric pressure exerted upon surface 24 from the ambient environment.

It is preferred that apparatus 10 be mounted such as via the hanger arrangement 60 so as to maintain a substantially vertical orientation. Particularly, hanger 60 comprises a plurality of flexible supports 62 attached adjacent upper rim 18 of container 15, and which can be suspended such as from hook 64. While the specific means for supporting apparatus 10 is not critical, and it is not imperative that the device remain exactly vertical in orientation, the hanging arrangement is preferred to minimize unnecessary movement of apparatus 10, and to minimize any eccentric alignment of container 15 which may compromise the accuracy or operation of the device.

Depending from the lower portion of float 30, and preferably attached along the effective centerline of float 30 is means 40 for providing a variable buoyancy equilibrium force to float 30. The equilibrium force is to offset the buoyant forces created by compressible fluid 33 within float 30. As will be understood, compressible fluid 33 will provide upward buoyant force on float 30, tending to move the float in an upward direction within container 15. In a preferred embodiment, means 40 will comprise a flexible length of ballast material which can be conveniently provided in the form of a chain-like structure 42. As illustrated, chain 42 comprises a plurality of individual links 44, and will preferably have an overall length at least equal to height S of support liquid 20 minus the overall length of float 30.

In the example of apparatus 10 detailed above, float 30 would have a longitudinal length sufficient to obviate potential cocking of the float within container 15. For example, float 30 might displace 126 milliliters of support fluid 20 (i.e. the predetermined first displacement volume of float 30 is 126 ml) and would entrap 25 milliliters of dry air as its compressible fluid 33 (i.e. the second predetermined volume of compressible fluid is 25 ml). As will be understood, these predetermined volumes must be initially established at some selected temperature, pressure, and position of float 30 within apparatus 10.

It is preferred that the volumes be set at a temperature corresponding to room temperature (e.g. 25° C.), as that is the temperature at which apparatus 10 will normally be operating in. It is also preferred that the volumes be set at the pressure corresponding to the normal atmospheric pressure at the altitude where the barometer will be used, and float 30 is located (at least theoretically) in approximately the middle of container tube 15. Means 40 preferably features a predetermined effective buoyant offsetting force or weight per unit length which can be varied to correspondingly vary the sensitivity of apparatus 10 to changes in ambient pressure.

Figure 3:
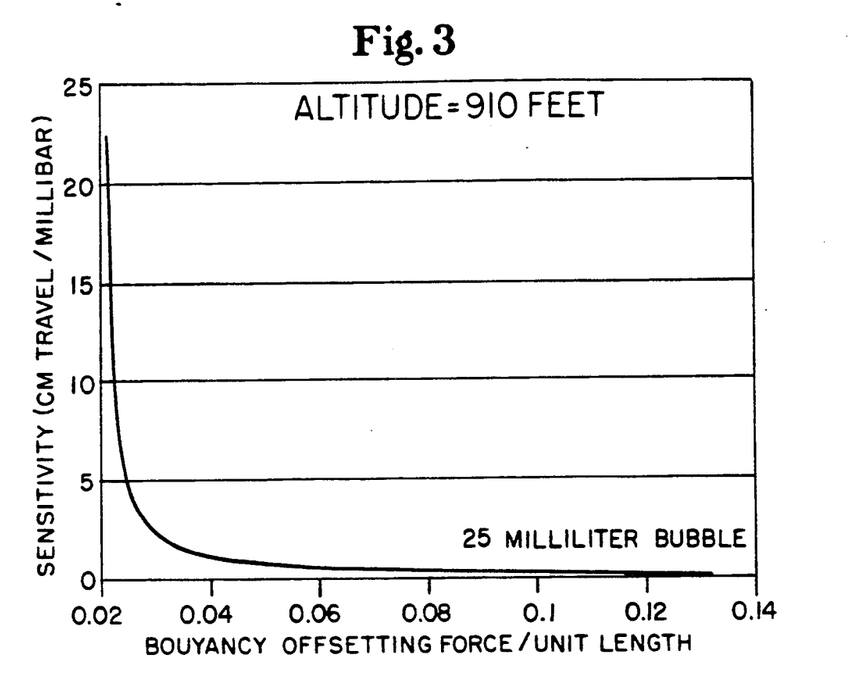
FIG. 3 is a graph plotting the sensitivity of a barometer made in accordance with the present invention against varying force per unit length of a preferred offset buoyant force device.

FIG. 3 graphically illustrates the varying sensitivity of an apparatus (e.g. apparatus 10 of FIG. 1) made in accordance with the present invention, using mineral oil described above having a specific gravity of about 0.9 gr/cm$^3$, wherein sensitivity of the device can be varied from approximately 0.2 cm per millibar to nearly 25 cm per millibar by varying the force per unit length (e.g. gr/cm) of variable buoyancy equilibrium means 40 between about 0.132 gr/cm and about 0.021 gr/cm. For example, if the sensitivity were set at 5, for every millibar change in ambient pressure (cm of water), the float will move 5 cm. For the example set forth above, if a fine chain 42 of approximately 0.02466 gr/cm were utilized, the sensitivity of the resulting apparatus would be 5. Therefore, the monitor line 34 would move 5 cm for every millibar change in pressure.

Figure 4:
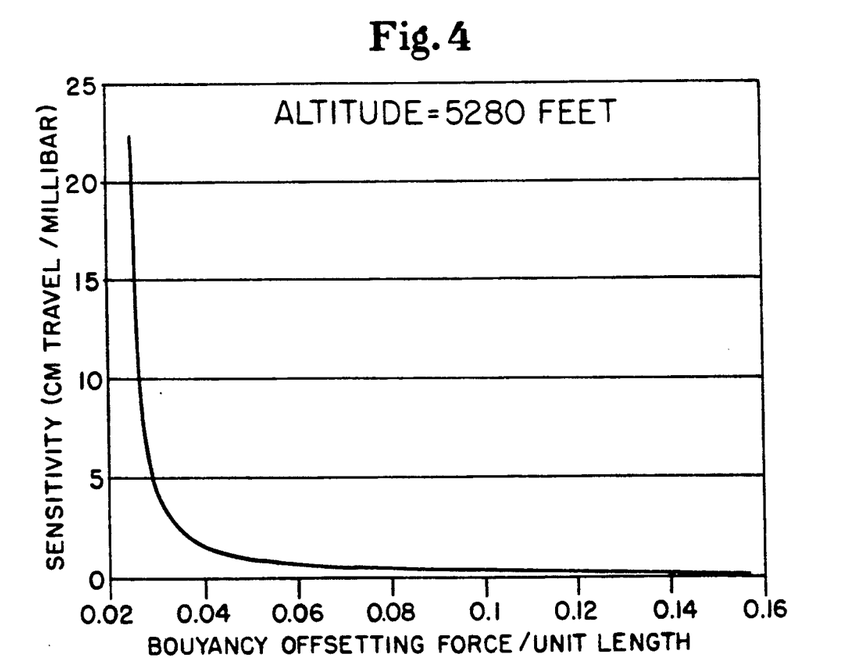
FIG. 4 is a graph similar to that shown in FIG. 3 showing the performance of a particular embodiment of the present invention at a different altitude.

As seen in FIG. 4, for an identical sensitivity factor of 5, apparatus 10 would have to have a chain weight of approximately 0.02937 gr/cm as a result of the varying altitude at which apparatus 10 would be operating. The graphs of FIGS. 3 and 4 also illustrate that below a minimum buoyancy offsetting force per unit length, the sensitivity of an apparatus of the present invention increases asymptotically to infinity (i.e. acts as a cartesian diver), and when the force per unit length is above a maximum (e.g. above 0.14 in FIG. 3), the sensitivity similarly approaches zero. These graphs also illustrate the slight variation in sensitivity that any particular apparatus will experience between differing altitudes.

The position of float 30 will be responsive to ambient pressure. As the pressure rises, compressible fluid 33 will tend to be compressed within float 30, and float 30 will tend to fall within container 15. As float 30 moves downwardly within the container, successive links 44 of chain 42 are deposited upon bottom wall 22 and no longer exert downward buoyancy offsetting forces on float 30. As a consequence, instead of continuing to plummet within container 15, float 30 again finds an equilibrium buoyant position therewithin as soon as sufficient weight has been effectively removed from float 30 by deposition of one or more links 44 of chain 42 upon bottom wall 22. The resulting movement of float 30 and its monitor line 34 will indicate a corresponding change in ambient pressure. Additional increase in pressure will correspondingly lower float 30 within container 15 and deposit additional links 44 of chain 42 on bottom wall 22. The distance of movement of float 30 for any particular change in pressure will be determined by the sensitivity of apparatus 10 which, as described above, can be determined by appropriate choice of the weight per unit length of means 40.

Conversely, when the ambient pressure drops, compressible fluid 33 will tend to expand and increase the buoyant force of float 30 within container 15. This increased buoyant force will tend to cause float 30 to rise within apparatus 10, which will, in turn, lift additional links 44 of chain 42 from bottom wall 22. The additional length of chain 42 will exert additional effective downward force on float 30, offsetting the increased buoyant force of compressible fluid 33. This additional weight will eventually cause float 30 to again find a new equilibrium position within container 15 at a distance above its previous position. The distance moved will again correspond to the magnitude of the pressure change and the sensitivity of the apparatus.

It is contemplated that to insure uniform operation and accuracy of apparatus 10, base 16 may include additional means 65 for applying vibration energy to base 16 and bottom wall 22 to ensure smooth movement of chain 42, and to maintain the excess chain length 45 in a relatively flat and untangled manner on bottom wall 22. Means 65 may preferably comprise an ultrasonic generator or similar means for providing vibratory energy.

As mentioned above, the barometric apparatus of the present invention relies upon the predetermined volume of compressible fluid trapped within float 30 to react to ambient pressure changes by expanding or contracting accordingly, thereby causing the float to fall or rise proportionally. In addition to the pressure changes which act upon the apparatus of the present invention, ambient temperature changes can also affect the performance and accuracy of the apparatus by causing the various elements of the apparatus to change in volume in response to rising or falling ambient temperatures.

For example, rising temperatures tend to cause elements to expand, while falling temperatures tend to cause contraction. Particularly, the coefficient of cubical expansion of dry air at 77° F. (25° C.) is 0.0033557 per degree centigrade, and the volume of the air maintained within float 30 will obviously vary accordingly as the temperature rises or falls. Similarly, support liquid 20 will have its own coefficient of cubical expansion, which will also inherently dictate corresponding changes in its volume in response to temperature changes. Specifically, the volume of the air within float 30 will increase by the fraction 0.0033557 (i.e. new volume = old volume × 1.0033557) for each one degree (°C.) increase in temperature. The buoyant force exerted by compressible fluid 33 similarly increases by the fraction 0.0033557. However, since the rising temperature also expands the volume of support fluid 20 (and reduces its density), the float 30, still displacing the same volume of support fluid 20, is now displacing less weight for that same volume, tending to cause float 30 to sink. Consequently, an increase in temperature causes the buoyant force on float 30 to increase proportionally to the volume of compressible fluid 33.

The same temperature rise causes a reduction in buoyant force on float 30 proportional to the total displacement volume of the float 30 multiplied by the cubical coefficient of expansion of support fluid 20. As detailed below, float 30 can be designed so that these two effects offset each other exactly. It will also be apparent that as the support fluid 20 expands or contracts, the buoyancy (positive or negative) of the chain 42 will also vary slightly. This effect has been found to be negligible if the chain 42 has a density above 10.0 (e.g. sterling silver). It has been contemplated that use of aluminum or aluminum alloys for chain 42 will introduce small but noticeable errors requiring the use of additional temperature correction methods described below.

Various mechanical arrangements for compensating for temperature variations have been attempted in the prior art, and others are set forth below with regard to alternate embodiments of the present invention. It has been found, however, that a preferred manner of accommodating fluctuations in relative temperature can be more simply and fully accomplished by specially designing indicator float 30 such that the ratio of the volume of compressible fluid within the float to the volume of total displacement of the float equals the ratio of the coefficient of cubical expansion of support liquid 20 to the coefficient of cubical expansion of the compressible fluid within the float (e.g. 0.0033557 for dry air). It has been found that when float 30 of the present invention is designed according to the following equation, and glass is utilized as a material for forming float 30, variations in ambient temperature have negligible effect upon the operation of apparatus 10:

$$\frac{(V_E)}{(V_F)} = \frac{\text{CCE of Support Liquid}}{\text{CCE of Compressible Fluid}}$$

Where:
$V_E$ = Volume of compressible fluid within float
$V_F$ = Total displacement volume of the float
CCE of Support Liquid = Coefficient of Cubical Expansion (per °C.)
CCE of Compressible Fluid = Coefficient of Cubical Expansion (per °C.) (e.g. 0.0033557 for dry air)
CCE of the Float itself is negligible Note:
If the CCE of the float is not negligible, then it may be necessary to provide additional displacement volume ($V_F$) in order to compensate for that CCE. In the above example, the float was designed with ratio of $V_E$ to $V_F$ of 126/25 (i.e., about 5.04), while the theoretical ratio was 0.0033557/0.000977 (i.e. 3.43). This arrangement fully compensated for temperature variations despite the use of steel ballast and epoxy materials from which the float was constructed.

It should be noted that while the equation ideally requires the ratios to be equal, in practice it has been found that substantial correspondence of the ratios is sufficient to effectively obviate the effects of temperature variations. When float 30 is designed in accordance with the above relationship, and expansion and contraction of float 30 itself is negligible, the respective expansion and contraction of support liquid 20 and the volume of entrapped air 33 will offset one another as described above, thereby cancelling out the effects of a variation in temperature. In this way, a wide variety of support liquids can be utilized in an apparatus of the present invention, with the coefficient of cubical expansion (CCE) of the particular support liquid in part determining the particular dimensions and volumes of a float 30 required to compensate for thermal variations in use. The example set forth above concerning the particular volumes for an exemplary float 30 were designed to meet the requirements of the above-referenced equation for use in low viscosity mineral oil having a CCE of 0.000977 per degree centigrade.

Figure 2:
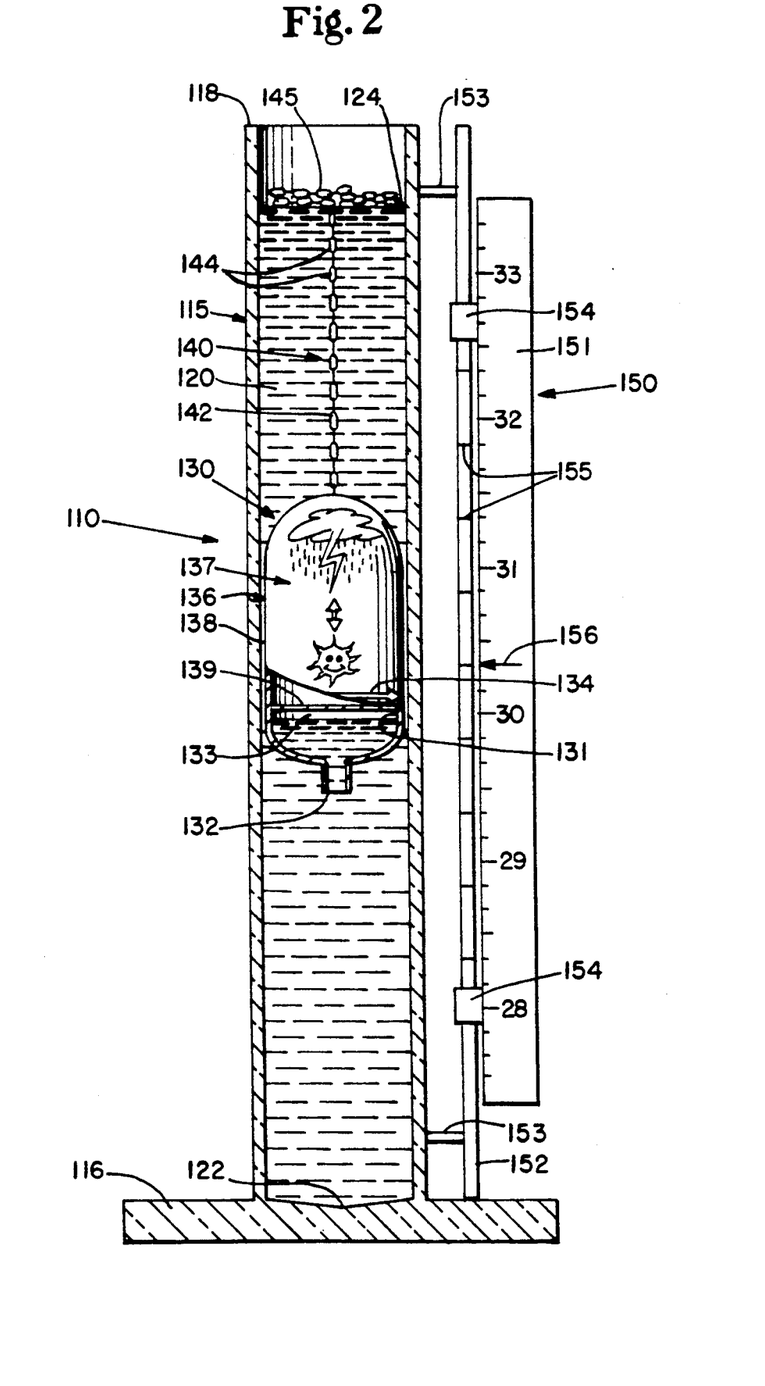
FIG. 2 is a broken-out, partial vertical cross-sectional view of an alternate embodiment of a super-sensitive barometer made in accordance herewith.

FIG. 2 illustrates an alternate embodiment of an apparatus 110 made in accordance with the present invention, wherein indicator float 130 includes a hollow interior 131 and an opening 132 providing fluid communication with support liquid 120. Attached to the upper portion of float 130 is an optional display chamber 136, which is preferably isolated from hollow interior 131 by seal 139. A portion of float 130 is broken away to better illustrate the preferred structural relationship of seal 139, chamber 136, and the lower portions of float 130.

Display chamber 136 may comprise an evacuated chamber, a chamber having a sealed predetermined volume of dry air or other gas, or may be a solid piece of material (if the density of that material is less than that of the support liquid). Preferably, display chamber 136 includes an ornamental display or figure such as the "rain clouds/sunny day" ornaments shown in FIG. 2. FIGS. 137 may preferably be three-dimensional objects located within chamber 136. It is contemplated that such ornamental elements may enhance the visual appeal of float 130 and apparatus 110, and may also simplify an understanding of the operation of the device to an observer.

Particularly, the ornamental FIGS. 137 shown in FIG. 2 indicate that a rising float 130 signifies stormy weather, while a falling float indicates better weather ahead. A stylized monitor line 134 is also shown as substantially coinciding with seal 139. Where a sealed chamber 136 is included, it may be necessary to include a predetermined counter ballast (e.g. lead shot or the like) within chamber 136 to insure that the weight of float 130 is balanced by the buoyancy forces of the float plus its variable buoyancy equilibrium device 140 (flotation structure 142). The counter ballast might also be useful to provide some additional tolerance to the manufacturing process of apparatuses made in accordance herewith, as the counter ballast may facilitate final calibration of the apparatus to ensure that float 130 moves in the desired portions of container 115 in use.

Apparatus 110 also illustrates an alternate embodiment of another preferred means 140 for providing a variable buoyancy equilibrium force to float 130. Particularly, a flexible, flotation structure 142 is illustrated as, for example, being a chain-like flotation structure attached to the upper portion of float 130. Like its counterpart chain-like ballast structure 42 described above, the chain-like flotation structure 142 preferably includes individual links 144 each having a predetermined buoyancy force per unit length (comparable to the gm/cm weight per unit length of chain 42 described above). Whether the variable buoyancy equilibrium force means of the present invention is provided as a ballast structure or a flotation structure, the operation of the device is unchanged, and apparatus 110 will be designed so that float 130 finds an equilibrium position near the center of the vertical column of container 115 when ambient pressure is in the middle of the normal range (i.e. between about 29-31 inches of mercury).

As will be understood, as the pressure falls, float 130 will tend to rise as a result of the expanding volume of compressible fluid 133 therewithin. As float 130 rises, additional links 144 of buoyant structure 142 will cease to impose upward buoyant force on float 130, and float 130 will eventually find a new equilibrium position above its previous position prior to the change in pressure. Excess buoyant chain-length 145 will simply float on the upper surface 124 of support liquid 120. Again, the use of an ultrasonic generator may facilitate maintaining buoyant chain 142 straight at all times and obviate any potential tangling of the individual links 144 in use. Neglecting the effects of surface tension of liquid 120 on links 144, a graph of the sensitivity of apparatus 110 would be essentially identical to the graphs shown in FIGS. 3 and 4.

FIG. 2 further illustrates a mechanical calibration mechanism 150 to compensate for variations in ambient temperature and to adjust for differences in altitude at which apparatus 110 is being used. Particularly, a standard 152 is mounted adjacent container 115 by a plurality of supports 153, and slidingly supports an adjustable scale 151. Standard 152 may preferably include a plurality of adjustment indicia 155, such as temperature or elevation presetting marks. Scale 151 preferably includes an adjustment aligner 156 which is to be aligned with an appropriate adjustment indicia 155 to adjust 151 to its proper position. Once adjusted, monitor line 134 of float 130 can be utilized as contemplated to indicate the correct absolute pressure (e.g. in inches of mercury).

It is contemplated that calibration mechanism 150 might be utilized instead of, or in addition to, the above-described custom designing of the volumes of float 130 to compensate for temperature variations. Particularly, where temperature variations are nulled from the system by design of float 130 as discussed, calibration mechanism 150 might be utilized to compensate for the small errors which may be induced by temperature variations where material having a density of less than 10 are used for buoyancy offsetting chain (e.g. 142), or to compensate for altitude differences so that apparatus 110 can be accurately utilized at a variety of geographic locations or different elevations at a single geographic location (e.g. on the first floor of a skyscraper or on the 50th floor).

When using a floating variable buoyancy equilibrium device such as chain 142, it should also be noted that surface tension of liquid 120 at its upper surface 124 may also impose some resistance to additional links 144 being pulled downwardly by float 130. While errors induced by surface tension will be small, they can be obviated by placing a floating cap (not shown) within container 115 to maintain all links 144 in a submerged relationship at all times. As such, links 144 would not be influenced by surface tension.

FIG. 2 also illustrates an alternate embodiment of base member 116 which is designed to provide a stand or support for apparatus 110 for mounting on a tabletop or other substantially flat structure.

Figure 5:
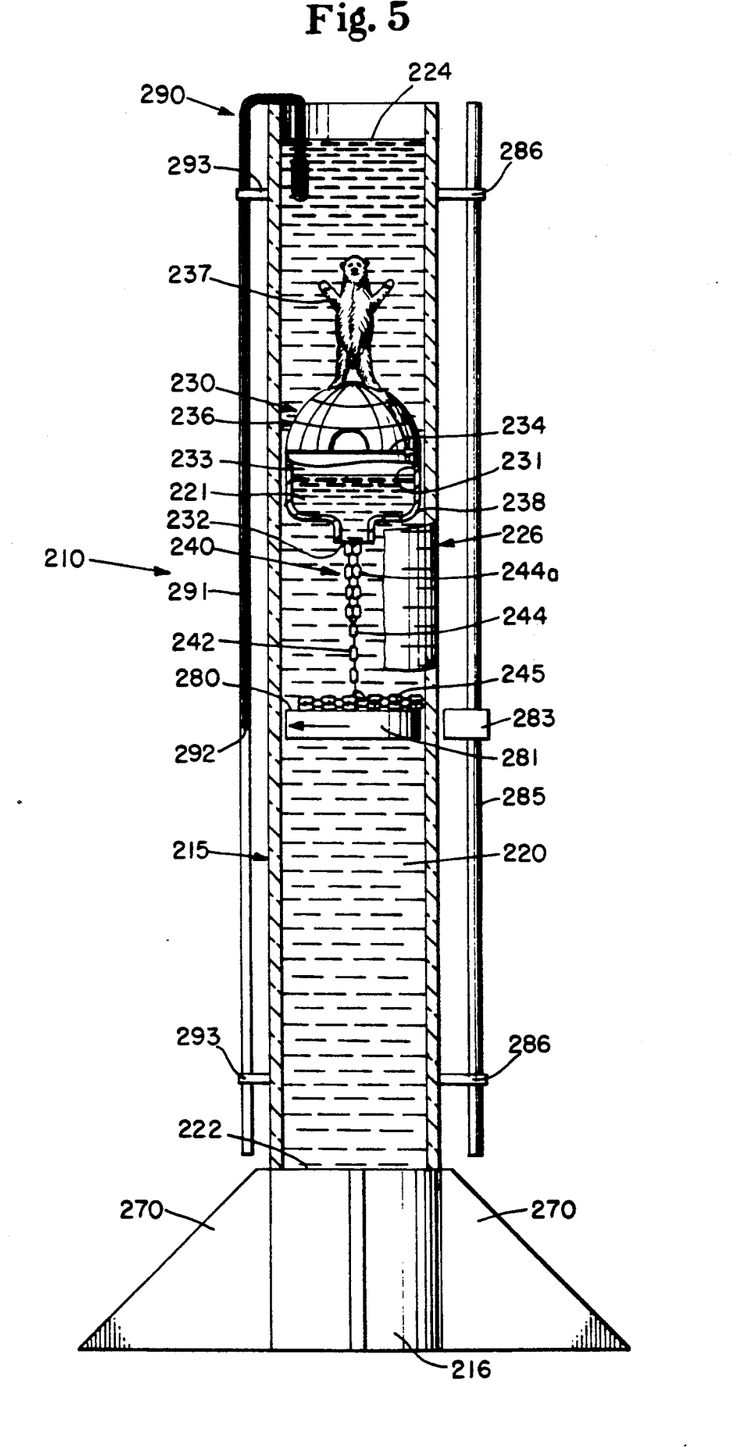
FIG. 5 is a broken-out, partial vertical cross-sectional view of yet another embodiment of the present invention illustrating a mechanical means for adjusting the apparatus to compensate for temperature variations.

FIG. 5 illustrates yet another embodiment of a supersensitive apparatus 210 for measuring variations in pressure in accordance with the present invention. Particularly, apparatus 210 includes a float 230 featuring a display chamber 236 and an ornamental figurine 237 (i.e. a polar bear) surmounting that display chamber (which has been formed in the shape of an igloo). As described above, float 230 comprises a hollow interior 231 for maintaining a compressible fluid 233 therewithin, and an open lower portion 232 for providing fluid communication with support liquid 220. Float 230 has been broken away below its display structure (i.e. the igloo and polar bear) to better illustrate details of its lower portions.

Means 240 for providing variable buoyancy equilibrium force to float 230 is provided via a chain-like ballast structure 242 similar to that described above with regard to FIG. 1. However, it should be noted that chain 242 is provided with double links 244a near its upper portions directly below float 230. The double links 244a are illustrated only as an example of a variation of the present invention which may be employed to provide a single apparatus 210 for measuring variations in pressure with a plurality of sensitivities to pressure changes.

Particularly, as described above with reference to FIGS. 3 and 4, the sensitivity of an apparatus (e g. 10, 110, 210) made in accordance with the present invention can be varied between approximately 0.2 cm/millibar to approximately 25 cm/millibar change in pressure. As can be appreciated, however, an apparatus having a sensitivity of 20 cm/millibar (as an example) would require a container length of more than 40 feet to enable accurate observation of ambient pressure in a normal range of between about 29 inches mercury to about 31 inches of mercury. Because a barometer of that length may be impractical in most situations, a predetermined variation in the force per unit length of the means for providing variable buoyancy equilibrium force to the float can be utilized to limit the required length of the container. Particularly, as can be appreciated, increased weight per unit length or buoyancy force per unit length near the opposite ends of variable buoyancy equilibrium means to 40 (or similarly ballast 40 or buoyant chain 140) will drastically reduce the sensitivity of the apparatus 210 (and similarly 10 and 110) as graphically represented in FIGS. 3 and 4.

For example, as illustrated in FIG. 3, if a weight of 0.02133 gm/cm were used for links 244, a sensitivity of approximately 20 cm/millibar would be achieved, while doubling that weight in the form of double links 244a would reduce the sensitivity to about 1.0. By utilizing an increased force variable buoyancy equilibrium means, having increased forces at predetermined portions of the pressure scale (i.e. at predetermined portions along the length of the means for providing variable buoyancy equilibrium forces to the float), apparatus 210 can provide very sensitive monitoring of pressure changes within a predetermined range (e.g. between about 29.8 and 30.2 inches of mercury), while being relatively insensitive to pressure changes at other predetermined ranges (e.g. below 29.8 inches and above 30.2 inches of mercury). In this way, the overall length of apparatus 210 can be controlled without sacrificing the sensitivity of the instrument for monitoring relatively small pressure changes. As should be understood, varying the buoyancy offsetting force of portions of equilibrium means (e.g. 40, 140, 240) of the present invention can similarly be accomplished by simply altering (e.g. by size, shape, density, etc.) individual links (e.g. 44, etc.) to be heavier or more buoyant as appropriate.

If high sensitivity is required for all ranges of pressure changes, a series of standard size apparatuses could be provided, with each having different but overlapping sensitive ranges. In this way, the entire scale of pressure changes could be sensitively monitored by the series of apparatuses without requiring any one of the devices to be unreasonably large. For example, one apparatus might cover the range of 26 to 29 inches of mercury, the next apparatus could cover the range of 28 to 30 inches, and the next could cover 29 to 31 inches of mercury, etc. By providing some overlap between the devices, as far as their range of sensitivity, accurate monitoring of the pressure could be maintained at all times.

Apparatus 210 illustrated in FIG. 5 also shows another preferred variation for ensuring accurate monitoring of absolute pressure differentials. Particularly, a means 290 for monitoring the temperature of support liquid 220 is provided in the form of thermometer 291, illustrated as being attached to container 215 via supports 293. As an alternative to temperature compensation by designing float 230 in accordance with the formula set forth above, temperature variations can be accounted for by providing an adjustable base 281 having an adjustable support surface 280.

A base adjuster 283 is provided for physically adjusting the position of base 281 and its support surface 280 from the exterior of apparatus 210. Adjuster 283 preferably comprises a source of magnetic energy which can be vertically adjusted along standard 285 illustrated as being connected to container 215 via supports 286. It is contemplated that temperature variations can be corrected by moving adjustor 283 as necessary to align base 281 with the temperature level display 292 (e.g. the thermometer level). By forming adjustable base 281 of magnetic material, its position can be adjusted from the exterior of apparatus 210 by location of base adjuster 283. It is also contemplated that adjustable base 281 can be moved to account for variations in altitude as well.

The temperature of support liquid 220 could also be monitored by an electronic control device designed to automatically move base adjustor 283 to proper position. In this regard, it is contemplated that a computer chip could be utilized to determine the proper adjustment for base 281 and its support surface 280 according to ambient temperature and the particular altitude at which apparatus 210 is operating.

FIG. 5 further shows an alternate embodiment of base 216 having a plurality of outwardly extending flanges or fins 270 designed to maintain apparatus 210 and its container 215 in a substantially vertical orientation. While apparatuses 110 and 210 shown in FIGS. 4 and 5 are illustrated without a cap similar to cap 19 simply for expedience, it should be understood that an appropriate cap of desired shape and size would normally be utilized in conjunction with these devices to protect against spillage and contamination by extraneous matter.

Figure 6:
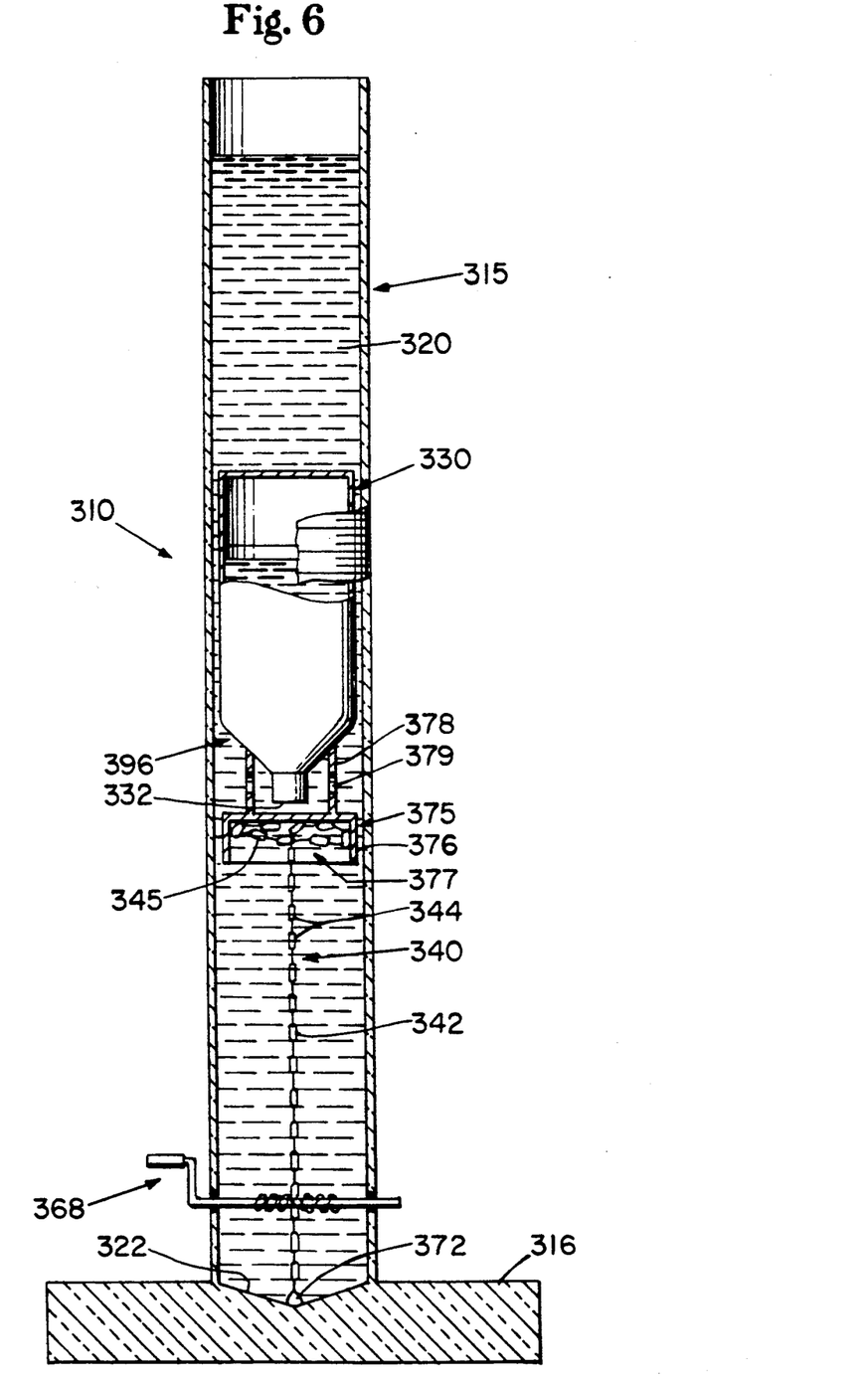
FIG. 6 is a partial vertical cross-sectional view of another alternate preferred embodiment of a super-sensitive barometer made in accordance herewith, wherein the flexible floatation structure is anchored below the float within the container.

FIG. 6 shows yet another alternate embodiment of an apparatus 310 made in accordance herewith. Particularly, apparatus 310 features means 340 for providing a variable buoyancy equilibrium force to float 330, and comprising a flexible floatation structure 342 anchored to the bottom wall 322 of container 315. Flexible floatation structure 342, for example, may preferably be a chain-like floatation structure attached via anchor 372 below the lower portion 396 of float 330 to provide variable buoyancy to float 330.

Attached adjacent lower portion 396 of float 330 is a floatation confinement structure 375, preferably comprising a downwardly oriented open cup-like structure having peripheral sidewalls 376 and a central opening 377 for receiving excess length (e.g., 345) of floatation structure 342. As will be understood, as float 330 rises, additional floating links 344 will be withdrawn from confinement structure 375 and will become tethered from anchor 372. In tethered condition, the floatation links 344 do not provide upward buoyant force on float 330, and, consequently, as additional links 344 are withdrawn from confinement structure 375, the buoyant force of the excess length 345 is reduced.

A connector 378 having one or more openings 379 to obviate pressure differences is provided for attaching floatation confinement structure 375 to float 330. Means 368 for adjusting the buoyant force provided by floation structure 342 is preferably provided in apparatus 310 via a rotatable winch-like structure (e.g., 368). The chain-like floatation structure is preferably wound around winch 368, so that the length extending upwardly toward float 330 can be adjusted from outside apparatus 310 as necessary. While FIG. 6 illustrates both a winch 368 and an anchor 372, it should be understood that the lower end of flexible floatation structure 342 could be "anchored" to winch 368, or, alternatively, winch 368 might be slidable along the vertical length of container 315 while the lower end of floatation structure 342 is attached to anchor 372 on bottom wall 322 as shown. It is contemplated that anchoring floatation structure 342 to winch 368 will be preferred to the slidable winch arrangement because of simpler sealing requirements between winch 368 and container 315. The remaining elements of apparatus 310 are substantially identical to similar elements discussed above with regard to the previous embodiments.

Figure 7:
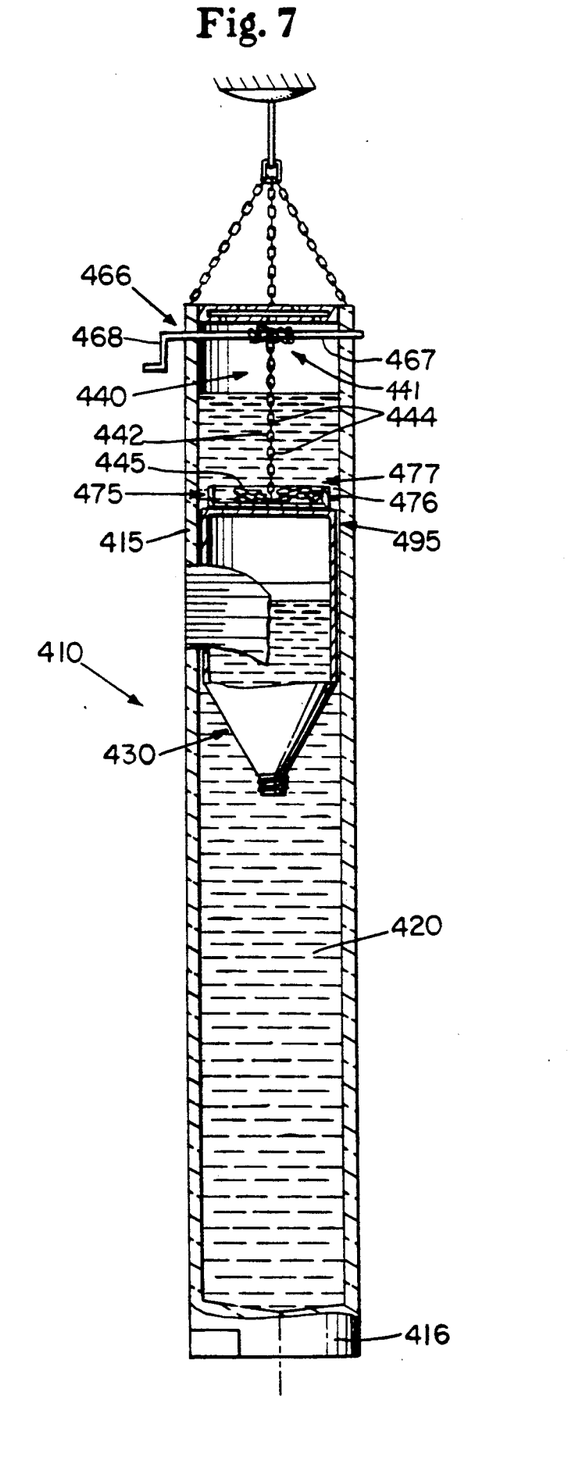
FIG. 7 is a partial cross-sectional view of yet another preferred embodiment of a super-sensitive barometer made in accordance with the invention, illustrating a flexible ballast supported above the upper portion of the float.

Another preferred embodiment of the present invention is illustrated in FIG. 7. Particularly, apparatus 410 is illustrated as similarly including a container tube 415 at least partially filled with support fluid 420, and including a vertically movable float 430 therewithin. The variable buoyancy equilibrium device 440 is contemplated as comprising a chain-like ballast 442 having individual links 444 of predetermined weight per unit length. Ballast chain 442 has a top end 441 supported above float 430 by an adjustable support 466. Particularly, adjustable support 466 is illustrated as preferably comprising a winch-like assembly having a support rod 467 journaled for rotation by application of rotation force to crank 468. In this way, support 466 can adjust the length of ballast chain 442 depending downwardly to float 430. Accordingly, the excess length 445 of ballast acting on float 430 can be adjusted as desired from outside or exterior of the support fluid 420.

Attached adjacent upper portion 495 of float 430 is a ballast confinement structure 475 for receiving the excess length 445 of ballast chain 442. Ballast confinement structure 475 is illustrated as comprising a cup-like device having a peripheral wall 476 and an upwardly facing open top 477 for receiving the excess length 445 of ballast chain 442.

As will be understood, rotation of support rod 467 causes additional length of ballast chain 442 to be wound around rod 467 (or, conversely, unwound from rod 467), thereby adjusting the downwardly depending length of variable buoyancy equilibrium means 440 as desired. By adjusting the length of ballast chain 442 via adjustable support 466, precise adjustments for changes or differences in altitude can be easily made, and manufacturing, storage and transportation, and assembly and set up can be significantly simplified.

Following assembly, float 430 can be accurately "zero adjusted" or calibrated in a simple and convenient manner. Lowering additional length of chain 442 into cup or pan 475 correspondingly lowers float 430, while winching up length of chain 442 removes excess length 445 from cup 475, thereby raising float 430. This permits a "zero adjust" or calibration to actual barometric pressure during initial setup and installation, and permits convenient adjustments if apparatus 410 is moved to a different altitude or elevation. This adjustability is substantially similar to the floatation adjustment provided in the embodiment of FIG. 6, described above. Correspondingly, operation of apparatus 410 will otherwise be substantially similar to the operation of the previous embodiments described above.

Having shown and described the preferred embodiments of the present invention, further adaptions of the described device for measuring variations in ambient pressure can be accomplished by appropriate modifications by one of ordinary skill in the art without departing from the scope of the present invention. Several of these potential modifications have been mentioned, and others will be apparent to those skilled in the art. Accordingly, the scope of the present invention should be considered in terms of the following claims and is understood not to be limited to the details of structure and operation shown and described in the specification and drawings.

I claim:

1. An apparatus for measuring variations in pressure, said apparatus comprising:

means for containing a volume of liquid;

an indicator float to be placed within said containing means and supported by said liquid contained therein, said float having upper and lower portions and a hollow interior portion for maintaining a compressible fluid therewithin, and being vertically movable within said containing means;

means connected to said float for automatically providing a variable buoyancy equilibrium force to said float to offset buoyant forces created by said compressible fluid, whereby said equilibrium force is automatically varied in response to varying buoyancy of said float resulting from the changing volume of said compressible fluid in response to changing ambient pressures, said variable buoyancy means comprising a flexible ballast structure having top and bottom ends and supported adjacent its top end above the upper portion of said float such that said bottom end depends downwardly to said float; and means connected to the upper portion of said float for receiving a length of the bottom end of said ballast structure.

2. The apparatus of claim 1, further comprising means for adjusting the support of said flexible ballast structure above said float, said adjusting means comprising means for varying the length of said flexible ballast structure received in said ballast receiving means.

3. The apparatus of claim 2, wherein said adjusting means comprises a rotatable device about which said flexible ballast structure may be wound, whereby rotation of said adjusting means varies the length of said flexible ballast structure received in said receiving means.

4. The apparatus of claim 2, wherein said adjusting means comprises a winch-like assembly located above said indicator float.

5. The apparatus of claim 2, wherein said adjusting means comprises a winch-like assembly which can be operated to calibrate the apparatus to accurately reflect ambient barometric pressure by varying the length of the ballast structure received in said receiving means.

6. The apparatus of claim 5, wherein said winch-like assembly is journaled for rotation relative to said apparatus, whereby rotation of the winch-like assembly varies the length of the ballast structure depending toward said float.

7. The apparatus of claim 6, wherein said winch-like assembly further comprises a support rod journaled for rotation by application of rotation force to a crank, and wherein said flexible ballast is at least partially wound around said rod such that rotation of said rod adjusts the downwardly depending length of the flexible ballast as desired.

8. The apparatus of claim 1, wherein said ballast receiving means comprises a cup-like structure attached to the upper portion of said float.

9. The apparatus of claim 1, wherein said flexible ballast structure provides a predetermined buoyancy force per unit length which varies along the length of said flexible structure.

10. The apparatus of claim 1, wherein said flexible ballast comprises a chain.

11. The apparatus of claim 10, wherein said chain further comprises individual links of predetermined weight per unit length.

* * * * *